United States Patent

[11] 3,629,089

[72] Inventor James R. Luck
 Minneapolis, Minn.
[21] Appl. No. 4,838
[22] Filed Jan. 22, 1970
[45] Patented Dec. 21, 1971
[73] Assignee Honeywell Inc.
 Minneapolis, Minn.

[54] FREE AND COMBINED CYANIDE MEASURING APPARATUS
 4 Claims, 1 Drawing Fig.

[52] U.S. Cl. .................................... 204/195,
 204/1 T
[51] Int. Cl. .................................... G01n 27/46
[50] Field of Search .......................... 204/1 T,
 195

[56] References Cited
UNITED STATES PATENTS

| | | | |
|---|---|---|---|
| 2,912,367 | 11/1959 | Asendorf et al. | 204/195 |
| 3,208,926 | 9/1965 | Eckfeldt | 204/195 |
| 3,413,199 | 11/1968 | Morrow | 204/195 |
| 3,298,944 | 1/1967 | Luck | 204/195 |

*Primary Examiner*—T. Tung
*Attorneys*—Lamont B. Koontz and Robert O. Vidas

ABSTRACT: There is disclosed an apparatus for measuring both free and combined cyanide in a solution. The invention also provides for means of distinguishing the quantities of various types of cyanide complexes contained in a solution.

PATENTED DEC 21 1971
3,629,089
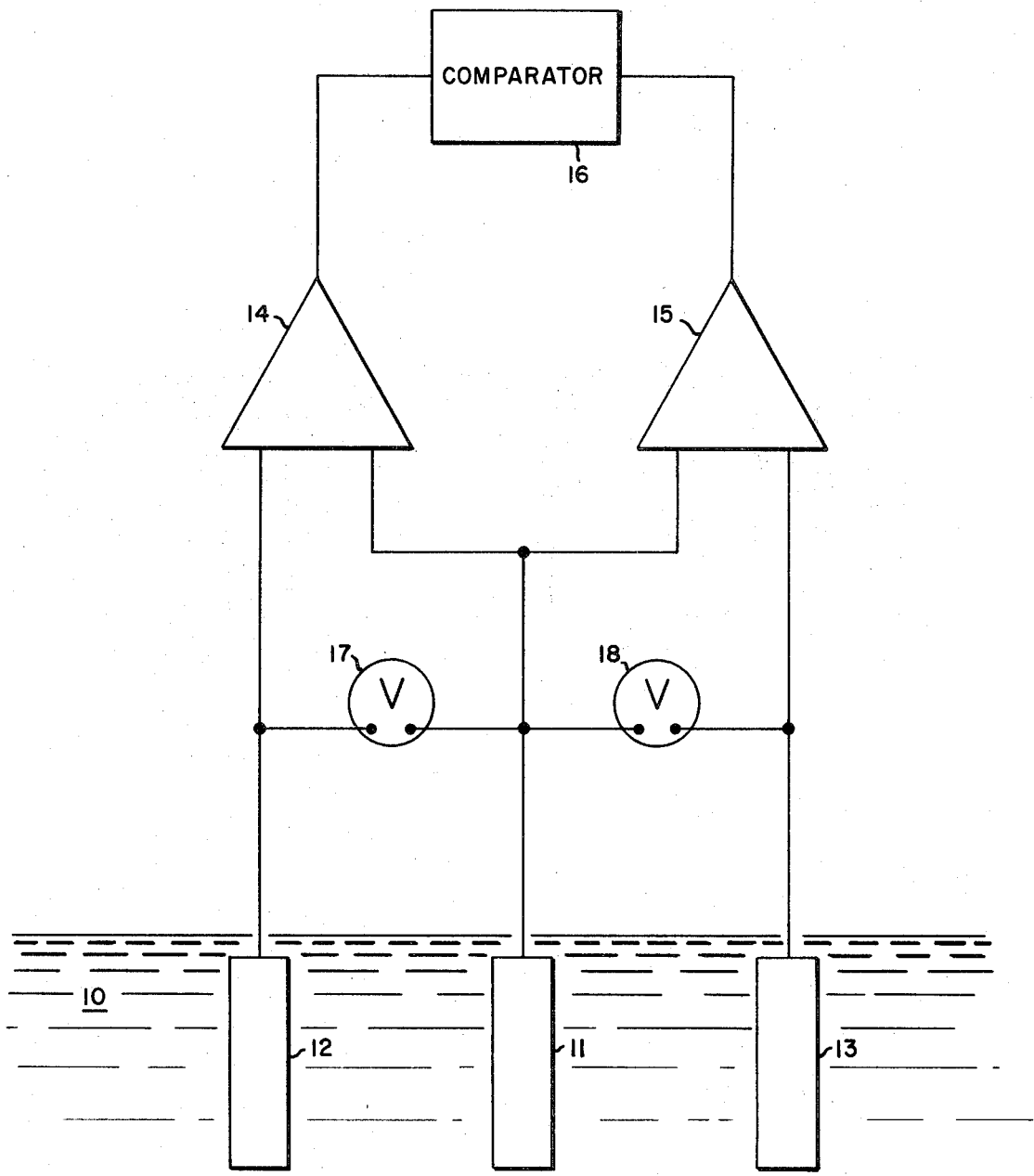
INVENTOR.
JAMES R. LUCK
BY Robert O. Vidas
ATTORNEY.

FREE AND COMBINED CYANIDE MEASURING APPARATUS

BACKGROUND OF THE INVENTION

The present invention is directed to a detector for pollution occuring primarily as a result of the effluent from the electroplating operations. The most commonly occurring polluting anion in electroplating solutions is the cyanide ion. This material is highly toxic and its presence in effluent discharged to sewage is thus undesirable. Along with the cyanide ion there are commonly many metal ions which form complexes with the cyanide. The control of the quantity of metal ions in the discharge of waste products from a plating operation is also desired.

The prior art has recognized the general problem and has proposed techniques for the determination of cyanide concentration. One such teaching is found in a Asendorf et al. U.S. Pat. No. 2,912,367 which describes an electrochemical technique for determination of cyanide ion.

SUMMARY OF THE INVENTION

The present invention is directed to an electrochemical system for the determination of not only total cyanide present in a solution but also to the determination of the quantities of cyanide occurring in free form as well as in complexes of metal ions. In its more specific form the invention also is useful in the determination of the specific quantity of cyanide present in the form of certain metallic complexes. In this mode of operation the invention is useful in determining the presence of and quantity of certain metal cyanide complex ions in a plating discharge. The invention makes use of three electrode measuring system incorporating a reference electrode which may be of a variety of conventional reference electrodes. In addition dissimilar metal electrodes are utilized which form complexes with the cyanide in solution, these complexes having stability constants that are significantly different from one another. By making electrochemical measurements with each of the metal electrodes one can combine the signals so as to produce a resulting signal which is indicative of the total cyanide, combined cyanide, free cyanide and/or by appropriate selection of electrodes the amount of certain types of metal cyanide complexes present in the solution.

BRIEF DESCRIPTION OF THE DRAWINGS

The sole FIGURE in the drawings illustrates in schematic form an electrochemical system in accordance with the invention.

DETAILED DESCRIPTION OF THE INVENTION

It is known that if one immerses an electrode of a metal forming complex ions with cyanide and a reference electrode into a solution containing cyanide ions that an electrochemical potential is produced in accordance with the Nernst equation due to the formation of a double layer on the surface of the metallic electrode. A measure of the potential so produced is used as a basis for the determination of the concentration of cyanide ion in a solution. In the present invention two metal electrodes are used in conjunction with the reference electrode to obtain information which is not available through the prior art techniques. In the discussion which follows it will be assumed that when a reference electrode is mentioned a reference electrode such as a standard calomel electrode (SCE) is indicated. However, one may use any of the other standard reference electrodes, such as the silver-silver chloride, a hydrogen electrode, or the like.

In one form of the present invention use is made of a first sensing electrode composed of a metal such as cadmium and a second sensing electrode of a metal such as gold. The reaction of metal ions of cadmium and gold with cyanide are indicated below along with the stability constance of these reactions.

$$Au(CH)_4^- \rightarrow Au^{+++} + 4CN^- \quad K = 10^{-56}$$

$$Cd(CN)_2 \rightarrow Cd^{++} + 2CN^- \quad K = 10^{-4.4}$$

Referring to the single FIGURE of the drawings it is seen that a solution whose cyanide and combined cyanide concentration is to be measure is generally identified as 10. Inserted into the solution are three electrode members. The electrode member schematically illustrated as 11 is a reference electrode which may be a saturated calomel electrode as has been previously noted. Also shown is a gold electrode member 12 and a cadmium electrode 13. Lead wires are connected to each of the electrode members and the leads from reference electrode 11 and indicating electrode 12 are connected to an amplifier 14 while reference electrode 11 and sensor electrode 13 are connected to an amplifier 15. The outputs of the amplifiers 14 and 15 are shown going to a comparator 16 which may be merely a meter showing a difference of the outputs of two amplifiers, or it may be any of a variety of means for illustrating the differential output of the two electrode systems 12 and 13. While 14 and 15 have been identified as amplifiers other potential measuring and display means for the outputs can be used. A volt meter such as meters 17 and 18 would be appropriate.

In operation if one assumes that the solution 10 contains dissolved therein a quantity of cyanide in the free form as well as cyanide complexes the results of operation of the system would be as follows. The cadmium electrode 13 would, because of its low stability constant for cyanide complexes, sense only the quantity of free cyanide that existed in the solution 10. If complexes of other metals, such as silver and copper, that are commonly found in plating bath waste waters were present the binding power of the copper or silver for the cyanide in the complex would be so stable that the cadmium would not be able to react therewith to give a signal due to the presence of this additional complexed cyanide.

The gold electrode would sense all cyanide that was present in the solution whether free or in complexed form. The copper cyanide complexes and silver cyanide complexes which are present in the solution of the example have stabilities markedly lower than that of gold cyanide complexes. Therefore the gold would respond in the presence of these complexes to bring about a reaction increasing the electrical output of the reference gold electrode system. Thus the gold would give the total cyanide present in the solution.

By combining the signals which are produced by the reference electrode gold system and the reference electrode cadmium system in a subtractive form one can determine the quantity of free cyanide as well as the quantity of complexed cyanide present in the solution. Of course, the gold electrode alone provides a signal which is indicative of the total cyanide. The total intensity of the voltage output for each of the sensor systems is dependent both on the presence of the cyanide and the complexes as well as on the quantity of these materials present in the solution. Thus in one system one is provided with a means for determining both presence of and concentration of cyanide as well as complex cyanide ion.

In a further form of the invention one may utilize this system to determine quantities of certain metallic ion that are present in the solution. If one assumes that the solution being discharged from the plating waste water contains cyanide ions and that this solution in addition contains certain quantities of metallic ions, one can by appropriate selection of electrode materials determine not only the cyanide concentration as discussed above, but can also determine the quantities of metallic ion in the solution. For example, if one considers the table below giving the stability constants for a number of cyanide complexes it can be readily seen that by appropriate selection of the electrode members 12 and 13 one can bracket a metallic ion response due to the complexed form of this ion with cyanide.

SIGNIFICANT COMPLEXES

| | |
|---|---|
| $Au(CN)_4^-$ | $K=10^{-56.0}$ |
| $Tl(CN)_4^-$ | $K=10^{-35}$ |
| $Hg(CN)_2$ | $K=10^{-33.5}$ |
| $Fe(CN)N_6^{-3}$ | $K=10^{-31.0}$ |
| $Cu(CN)_4^{-2}$ | $K=10^{-25.0}$ |
| $Ni(CN)_4^{-2}$ | $K=10^{-22}$ |
| $Ag(CN)_2$ | $K=10^{-19.9}$ |
| $Co(CN)_6^{-4}$ | $K=10^{-19.1}$ |
| $Zn(CN)_5^-$ | $K=10^{-17}$ |
| $Pb(CN)_4^{-2}$ | $K=10^{-10.3}$ |
| $Cd(CN)_2$ | $K=10^{-4.4}$ |

As illustrative of this mode of operation of the invention consider the situation where the discharge waters of the plating room contained quantities of zinc, silver, and copper ions as well as quantities of cyanide ion. As long as there was any free cyanide in the discharge solution all of the metal ions would be tied up to cyanide in complex forms. Now, if one wished to determine the amount of silver that was being discharged from the plating room one could provide a system as generally described previously with the selection of any metal from copper through gold in the above table for stability constant as one electrode and select an electrode of cobalt for the second electrode. The cobalt electrode would determine all of the cyanide present in the solution including free and combined cyanides of cadmium, lead and zinc while the copper electrode would determine all of the cyanide including that combined with nickel, silver, cobalt, zinc, lead and cadmium. By substracting the two signals in the manner described one could determine the quantity of silver ion that was complexed with cyanide in the waste liquid coming from the plating operation. Similarly, by selection of other electrode material one could determine various other combinations of metallic ions.

Having described by invention I claim:

1. An electrochemical measuring system for determining the concentration of free cyanide and combined cyanide in a solution comprising in combination:

a electrode of a metal adapted to form with cyanide ions a complex ion having a first stability constant;

a second electrode of a metal different from the first mentioned metal adapted to form with the cyanide ions a complex ion having a second stability constant;

a reference electrode, said electrodes adapted to be introduced into a solution whose cyanide concentration is to be measured, first circuit means connecting said first electrode and said reference electrode to a potential measuring means;

second circuit means connecting said second electrode and said reference electrode to another potential measuring means;

comparator means for combining the signal from said first and second circuits to give a resultant signal.

2. A system in accordance with claim 1 including indicating means for displaying said signal.

3. A system in accordance with claim 1 wherein the first mentioned metal is gold and the other metal is cadmium.

4. A system in accordance with claim 3 wherein the reference electrode is a saturated calomel electrode.

* * * * *